(No Model.)
H. & L. IWAN.
Ditching Hoe.
No. 230,130.  Patented July 20, 1880.
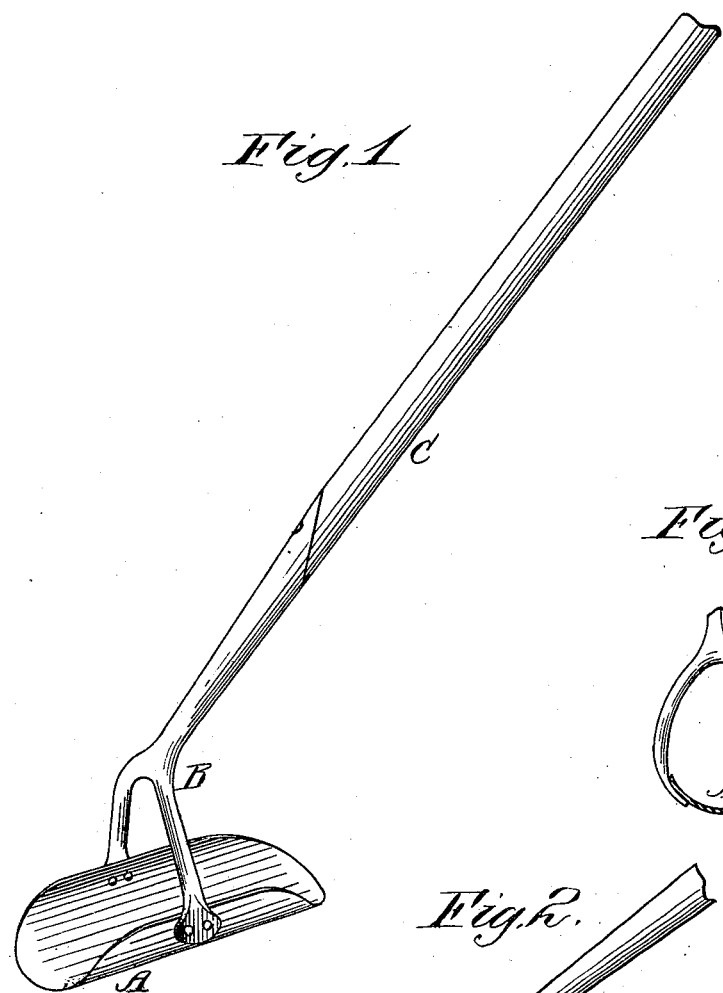
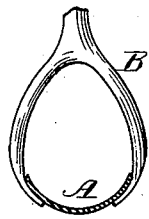
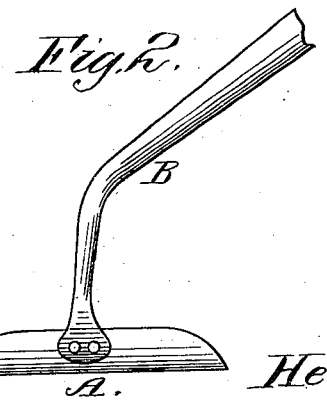
Witnesses
Nat. E. Oliphant
Geo. B. Porter
Inventors
Henry Iwan,
Louis Iwan,
per Chas. H. Fowler,
Attorney.

United States Patent Office.

HENRY IWAN AND LOUIS IWAN, OF ROBERTS, ILLINOIS.

DITCHING-HOE.

SPECIFICATION forming part of Letters Patent No. 230,130, dated July 20, 1880.

Application filed May 24, 1880. (No model.)

*To all whom it may concern:*

Be it known that we, HENRY IWAN and LOUIS IWAN, citizens of the United States, residing at Roberts, in the county of Ford and State of Illinois, have invented certain new and useful Improvements in Ditching-Hoes; and we do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a side elevation of the same, and Fig. 3 a detailed view, partly in section.

The present invention has relation to certain new and useful improvements in hoes for cleaning out and leveling or reducing the uneven surfaces of ditches, to more thoroughly and effectually prepare the same for laying tile, the invention consisting of the peculiar form of the blade and connecting it to the shank or handle at an acute angle, as illustrated in the drawings, and hereinafter described.

In the accompanying drawings, A represents the blade of the hoe, which is concavo-convex in form, and has connected to it, by rivets or other suitable means, a bifurcated shank, B, having a socket to receive a handle, C, of wood or other suitable material, the blade and bifurcated shank being constructed of metal.

The special purpose for which the hoe is designed renders it necessary not only to be used as such by the person drawing it toward him, but again as a shovel by pushing it forward, these two movements of the blade being essential to successfully clean out and level the ditch.

In order to insure its adaptation to the manner of using as above described, the shank or handle is connected to the blade midway of its ends, both of which are formed with an edge. It is not, however, absolutely necessary that the shank or handle be connected to the blade at its center or midway of its ends, as shown in the drawings, as the distance between the ends of the blade and point of connection of the shank may be varied so long as the ends of the blade project out at each side of the shank or handle, to be susceptible of being used in the same manner as is a hoe, and also a shovel.

In leveling and cleaning out the ditch in such manner as to successfully lay the tile it is necessary that the blade A should be concavo-convex in form; and to render the hoe easily operated as such, and also as a shovel in pushing it forward, the shank or handle is connected to the blade at an acute angle therewith, the blade being in a horizontal position.

Having now fully described our invention, what we claim as new, and desire to secure by Letters Patent, is—

A ditching-hoe consisting of the concavo-convex blade A, having a double edge, in combination with a bifurcated shank, B, and handle C, connected to the blade midway of its ends and at an acute angle therewith, substantially as and for the purpose set forth.

In testimony that we claim the above we have hereunto subscribed our names in the presence of two witnesses.

HENRY IWAN.
LOUIS IWAN.

Witnesses:
CHRISI. ANDERSON,
THOMAS MCNEISH.